Feb. 3. 1925.
G. A. McCONKEY
1,525,404
ENGINE TESTER
Filed July 12, 1921
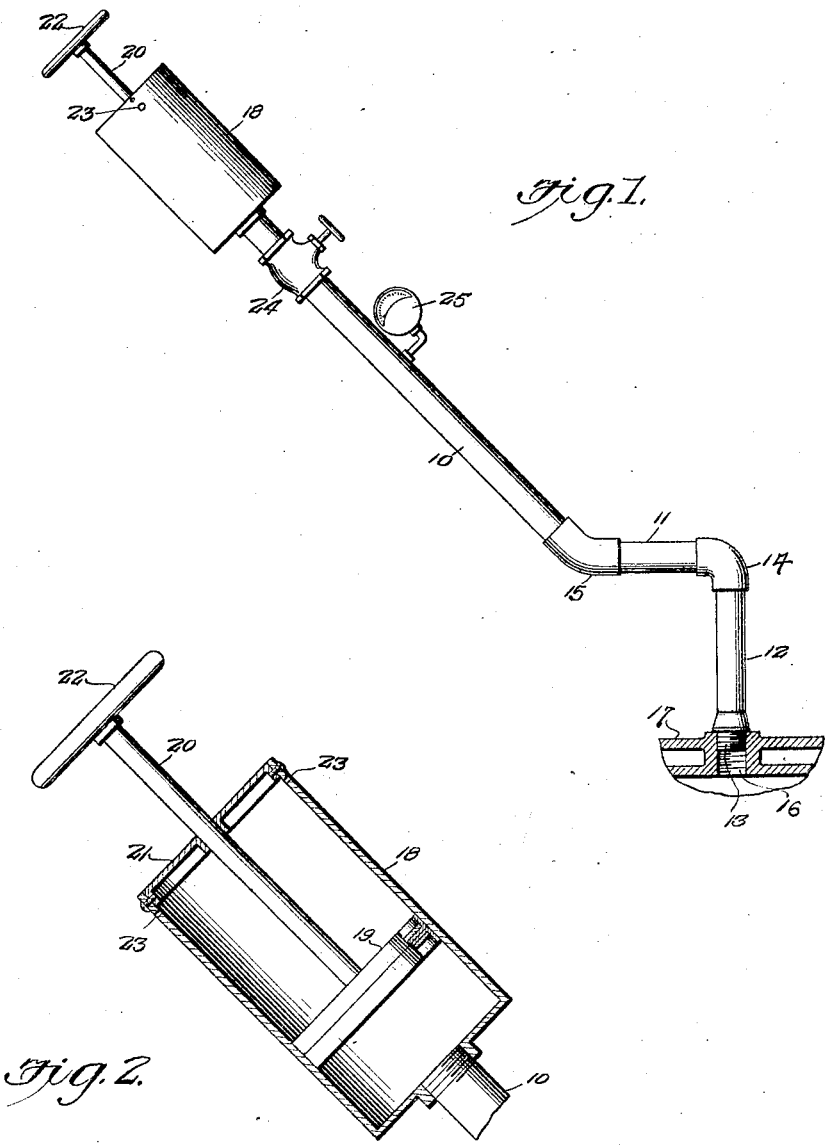
Inventor
G. A. McConkey,
By Geo. P. Kimmel, Attorney Patented Feb. 3, 1925.

1,525,404

UNITED STATES PATENT OFFICE.

GEORGE A. McCONKEY, OF EUREKA, KANSAS.

ENGINE TESTER.

Application filed July 12, 1921. Serial No. 484,171.

*To all whom it may concern:*

Be it known that I, GEORGE A. McCONKEY, a citizen of the United States, residing at Eureka, in the county of Greenwood and State of Kansas, have invented certain new and useful Improvements in an Engine Tester, of which the following is a specification.

This invention relates to devices for detecting loose or irregularly operating or moving parts in various forms of mechanical devices which are concealed from view, and without the necessity for dismembering the mechanism, and has for one of its objects to simplify and improve the construction and increase the efficiency anl utility.

Another object of this invention is to produce a device of this character which may be readily adapted without structural change to various kinds of machinery.

With these and other objects in view, the invention consists of certain novel features of construction as hereinafter shown and described and then specifically pointed out in the claim, and in the drawings illustrative of the preferred embodiment of the invention—

Figure 1 is a side elevation of the improved apparatus applied.

Fig, 2 is an enlarged sectional detail of the cylinder portion of the device.

The improved device is designed more particularly for use in detecting and locating loose parts in the concealed portions of machinery, such as loose bearings, loose or worn pistons, leaky piston rings or valves, loose wrist pins, connecting rod bearings, or for testing the compression on motors of various kinds, especially internal combustion engines of various kinds.

The improved device in its simpler form includes a portion of piping of any suitable size or length, or with any required number of bends or "crooks" to enable the piping to be connected to otherwise inaccessible portions of the machinery to be tested.

For the purpose of illustration the piping is shown formed of a main section 10, and shorter sections 11 and 12, the section 12 being threaded as shown at 13 at one end and coupled to the section 11 by an elbow 14 and the sections 10 and 11 coupled by an angular elbow 15.

The threaded terminal 13 is designed to be engaged in a threaded aperture in the body of the structure to be tested, for instance the threaded seat or socket 16 for one of the spark plugs of an internal combustion engine, a portion of the adjacent wall of the engine structure being indicated at 17.

The pipe sections are thus arranged with the main section 10 directed substantially at an angle of 45° relatively to the sections 11 and 12.

By this means the device is adapted to be coupled to the structure in which the test is to be made at otherwise inaccessible localities.

Attached to the outer end of the pipe section 10 is a cylinder 18 of suitable size, and provided with a piston 19 and piston rod 20, the latter operating through the outer end closure 21 of the cylinder and provided with a suitable hand grip 22.

The cylinder 18 is provided with an escape orifice 23 while pipe section 10 is provided with a controlling valve 24 and a pressure gage device 25 of suitable construction.

The device in operation is attached to one of the spark plug threads in the engine block after removing the spark plug, and the valve or cut off 24 closed. The engine is then turned over slowly by hand and when the engine which is associated with the removed spark plug is on "compression", the pressure in the cylinder is correctly recorded on the gage. This may also be used with the engine running. If there are no loose parts the gage will not vary, but if there is any leakage the gage will indicate it. The mechanic or attendant is thus able to determine whether or not the cylinder has defective piston rings or leaky valves.

Then if the cutoff valve 24 be opened, and the engine turned to compression on the cylinder with which the device is associated and the piston or plunger then moved backward and forward, this action operates as a pump on the piston in the engine cylinder thus moving the engine piston if it has any play on the connecting rod or wrist pin bearings. The different sounds of the main bearings and connecting rod bearings and also loose wrist pins can easily be detected and distinguished by even an amateur mechanic.

Because of its simplicity and few movable parts the device is not liable to get out of order and consequently needs little attention or repairs, The device is very simple in construction, can be easily adapted to engines or other machinery of any size or structure.

The preferred embodiment of the invention is disclosed in the drawings and set forth in the specification, but it will be understood that any modifications within the scope of the claimed invention may be made in the construction without departing from the principle of the invention or sacrificing any of its advantages.

What I claim is:—

In an engine tester of the character described, means to provide a single pipe line of substantial length, having one end threaded for insertion into the spark plug opening of an engine cylinder, a valve in said pipe line, a pressure gage carried by and communicating with the interior of said pipe between said valve and that end of the pipe line adapted to be connected with said cylinder to indicate, when the valve is closed, the pressure created upon the upstroke of the piston within the cylinder, and a cylinder connected to the other end of said pipe and having a piston therein by which air may be forced into the engine cylinder to indicate the amount of play in the parts supporting the piston therein, In testimony whereof I affix my signature hereto.

G. A. McCONKEY.